(12) United States Patent
Dionne

(10) Patent No.: US 6,945,434 B1
(45) Date of Patent: Sep. 20, 2005

(54) DEVICE THAT FACILITATES POURING OF LIQUID FROM A CONTAINER

(76) Inventor: Patrice R. Dionne, 77005 Miller, Chapel Hill, NC (US) 27517

( * ) Notice: Subject to any disclaimer, the term of this patent is extended or adjusted under 35 U.S.C. 154(b) by 67 days.

(21) Appl. No.: 10/604,871

(22) Filed: Aug. 22, 2003

(51) Int. Cl.$^7$ ............................................... B67D 5/06
(52) U.S. Cl. ..................................... 222/186; 222/463
(58) Field of Search ............................... 222/173, 184, 222/186, 463; 248/133, 139, 143

(56) References Cited

U.S. PATENT DOCUMENTS

| | | | |
|---|---|---|---|
| 144,442 A | 11/1873 | Caverly | |
| 411,229 A | 9/1889 | Stevenson | |
| 480,095 A | 8/1892 | Holme | |
| 486,484 A | 11/1892 | Leggett | |
| 497,878 A | * 5/1893 | Higham | 248/143 |
| 1,048,493 A | * 12/1912 | Catlin | 248/143 |
| 2,439,581 A | * 4/1948 | Robins | 280/35 |
| 2,910,304 A | * 10/1959 | Caylor | 280/47.131 |
| 3,702,660 A | * 11/1972 | Berger | 414/778 |
| 4,003,503 A | * 1/1977 | Aldridge | 222/173 |
| 6,386,393 B1 | 5/2002 | Paulovich | |

* cited by examiner

Primary Examiner—Joseph A. Kaufman
(74) Attorney, Agent, or Firm—Ronald E. Smith; Smith & Hopen, P.A.

(57) ABSTRACT

A device that makes it easier to pour a liquid from a container that might be difficult to lift for a person having hand, finger, or arm muscles that have been weakened by disease, injury, old age, or the like. The device has a generally "L" shape when viewed in front view, with a base for supporting the container and an upstanding sidewall formed integrally with the base at an end of the base. A curvature that extends from the top to the bottom of the sidewall is formed on the outward side of the sidewall. A person requiring assistance grasps a handle of a container supported by the base and rotates the device over onto the curvature so that liquid may pour from the container without lifting the container or the device. The device is rotated back into its repose position when the pouring is completed.

2 Claims, 4 Drawing Sheets

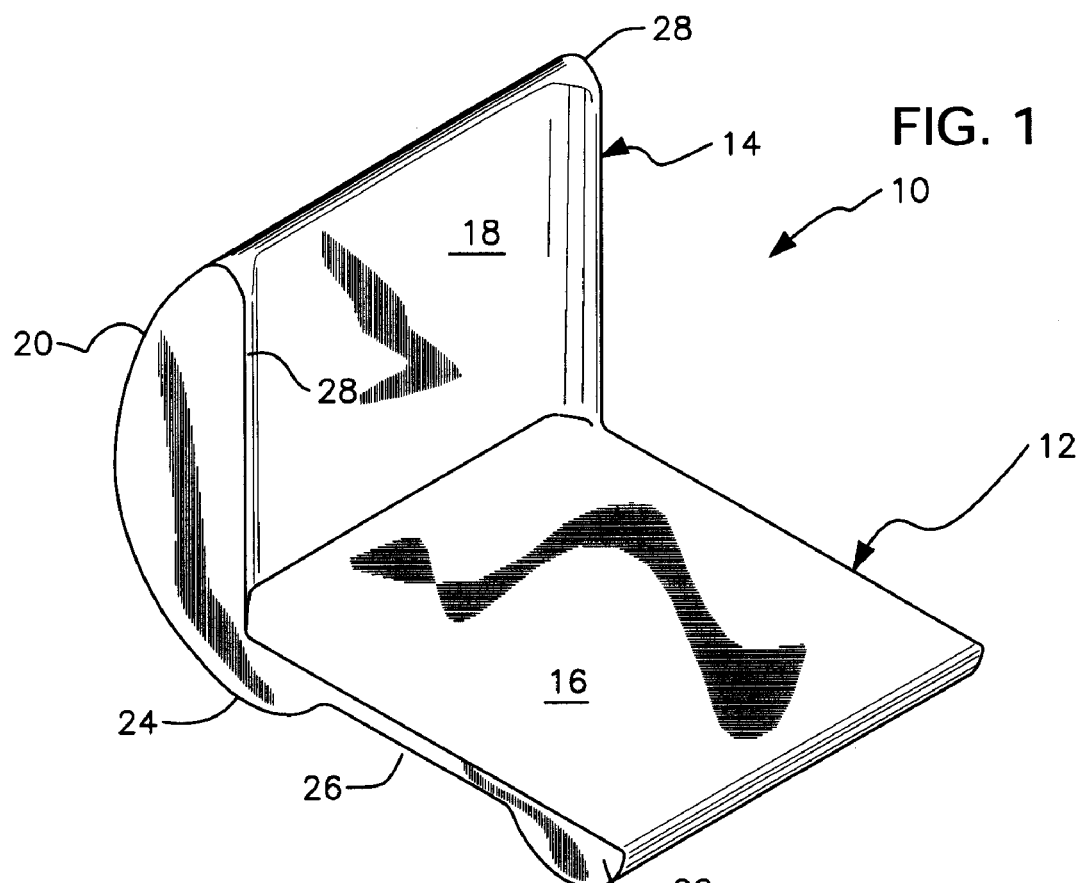
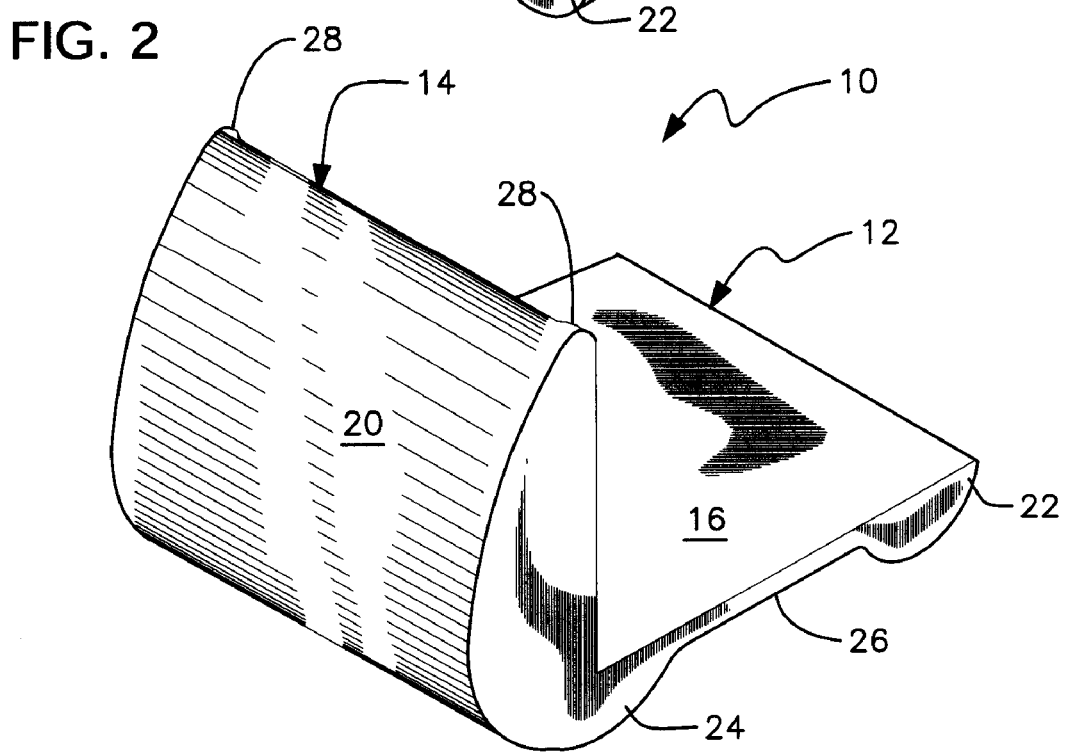

DEVICE THAT FACILITATES POURING OF LIQUID FROM A CONTAINER

BACKGROUND OF INVENTION

1. Field of the Invention

This invention relates, generally, to devices that help people perform tasks that they might otherwise find difficult to perform. More particularly, it relates to a device that enables people with limited muscular power to pour liquid from a container without having to lift the container from a support surface.

2. Description of the Prior Art

A person may develop weakness in the fingers, hands, wrists, or arms as a result of disease, old age, nerve damage, or the like. An injury may also cause at least temporary weakness. Lifting a heavy container, such as a milk container, to pour a glass of milk can be a difficult chore for a person who has experienced a loss of strength for any reason.

U.S. Pat. No. 6,386,393 to Paulovich and others discloses a tipping rack, especially for large heavy duty liquid detergent containers.

U.S. Pat. No. 144,442 to Caverly (1873) depicts a device having a stable stand and a rounded sidewall that enables a liquid container supported by the stand to be tilted when the stand is rotated onto its rounded sidewall.

Stephenson, in U.S. Pat. No. 411,229 (1889), shows a variation of the Caverly structure. It differs in that the bottom stand is also curved and therefore is not stable.

The Holme device, disclosed in U.S. Pat. No. 480,095 (1892) represents another variation. It differs from the others in that its handle projects above the container to be tilted.

Leggett's device, disclosed in U.S. Pat. No. 486,484 (1892), is attached to a large drum and includes no bottom stand.

What is needed, then, is a device that would enable a person with limited strength to pour liquid from a heavy container without needing to lift the container from a support surface.

However, in view of the prior art considered as a whole at the time the present invention was made, it was not obvious to those of ordinary skill in the pertinent art how such need could be fulfilled.

SUMMARY OF INVENTION

The long-standing but heretofore unfulfilled need for a device that facilitates the pouring of liquid from a heavy container is now met by a new, useful, and nonobvious invention. The novel device facilitates pouring liquid from a container and includes a generally square base having a first or back end and a second or front end. The base is adapted to be supported atop a support surface such as a tabletop. A sidewall is formed integrally with the base at the front end thereof. The sidewall is disposed in normal relation to the base.

The base has a flat top surface that is adapted to support a generally flat bottom wall of liquid-holding container having a handle. The liquid-holding container has a top wall with a spout formed therein, a front wall, a back wall having said handle formed integrally therewith, a pair of sidewalls, and a flat bottom wall. The handle is disposed rearwardly of the spout.

The sidewall of the base has a flat back surface adapted to abut the generally flat front wall of the liquid-holding container. A curvature is formed in a front surface of the sidewall of the base. The curvature extends from a lowermost end of the sidewall of the base to an uppermost end thereof.

The curvature is uniform from a front of the device to a bank thereof so that the device is stable when rotated. The first or back end of the base is lifted from the support surface when the device is tilted toward the second or front end by manipulating the handle of the liquid-holding container. The flow of liquid from the spout with thus be toward the front of the container, away from the user's hand.

The liquid-holding container is supported by the flat top surface of the base when the novel device is in a position of repose and is supported at least in part by the flat back surface of the sidewall of the base when the device is rotated onto the curvature formed in the front surface of the sidewall of the base.

Liquid is poured from the container when the device is rotated onto the curvature by a user grasping the handle of the container. The user need not lift the liquid-holding container from the flat top surface of the base during the pouring procedure and need not lift the device from the support surface during the pouring procedure.

A first foot is formed at the first or back end of the base and said first foot has a curved bottom surface. A second foot is formed at the second or front end of the base and said second foot has a curved bottom surface. The curved bottom surface of the second foot is seamlessly formed with the curvature formed in the front surface of the sidewall of the base.

The first foot and said second foot perform the function of spacing the base apart from the support surface to provide a mechanical advantage to the rotation of the device about the second foot and onto the curvature.

An important object of this invention is to provide a device that facilitates the pouring of liquid from a heavy container.

Another important object is to provide such a device in a small, light-in-weight structure that is affordable and easy to use.

Another object is to provide a device that includes no handle of its own to thereby simplify its construction.

Another object is to achieve the foregoing object in part by providing a pouring device that takes advantage of the pre-existing handle of the container from which a liquid is to be poured.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which:

FIG. 1 is a front perspective view of the novel device;

FIG. 2 is a rear perspective view thereof;

DETAILED DESCRIPTION

Figure 3:
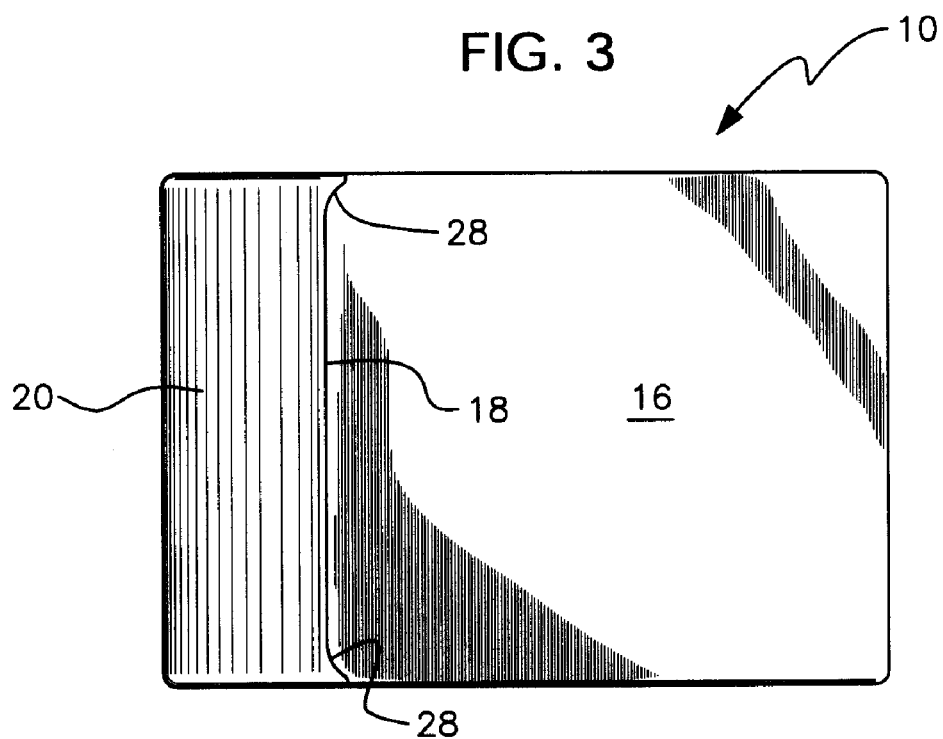
FIG. 3 is a top plan view thereof.

Referring to FIGS. 1 and 2, it will there be seen that the reference numeral 10 denotes an illustrative embodiment of the present invention as a whole.

Novel device 10 has a generally "L" shape formed by base 12 and side wall 14 that is formed integrally with said base and which is disposed in perpendicular or normal relation thereto. For explanatory purposes, the end of the base to which the sidewall is adjoined is referred to as the second or front end and the opposite end of the base is referred to as the first or back end.

Base 12 includes flat support surface 16 upon which is placed a container when device 10 is in use, as will be disclosed hereinafter. Sidewall 14 includes a flat, vertical, back surface 18 for supporting the container when device 10 is tipped in a manner disclosed hereinafter.

A curved surface, denoted 20, sometimes referred to hereinafter as a curvature, is formed on the front side of said sidewall 14.

Base 12, when in its position of repose as depicted in FIGS. 1 and 2, is supported along its first end by first foot member 22 and along its second end by second foot member 24.

Accordingly, bottom wall 26 of base 12 is spaced apart from a support surface upon which device 10 is positioned when in use. As will become clear as this description proceeds, the support surface is typically a kitchen table or counter top.

Both first foot member 22 and second foot member 24 are curved. Such structure spaces base 12 in vertically spaced relation to the support surface for device 10.

By providing space between said support surface and flat top surface 16 of base 12, a mechanical advantage is provided when device 10 is rotated in the manner hereinafter described.

Curved surface or curvature 20 extends from second foot member 24 to the uppermost edge of sidewall 14. The curvature of second foot 24 is seamless with curvature 20.

Vertically extending wings 28, 28 are formed integrally with sidewall 14 and project a short distance therefrom towards the first end of device 10. Such wings help center a container, not depicted in FIGS. 1 and 2, when said container is disposed in abutting relation to sidewall 14.

Figure 4:
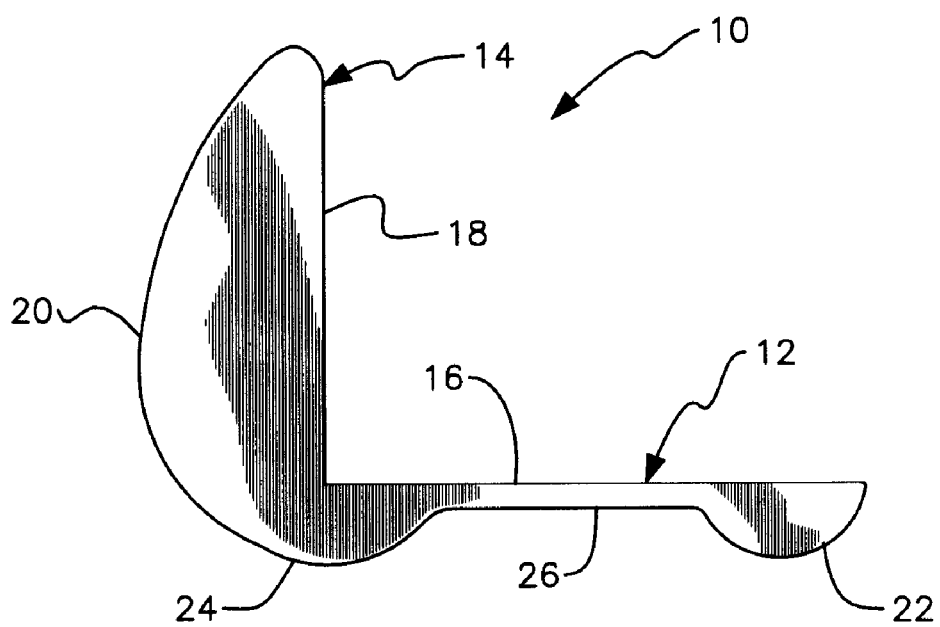
FIG. 4 is a side elevational view thereof.
Figure 5:
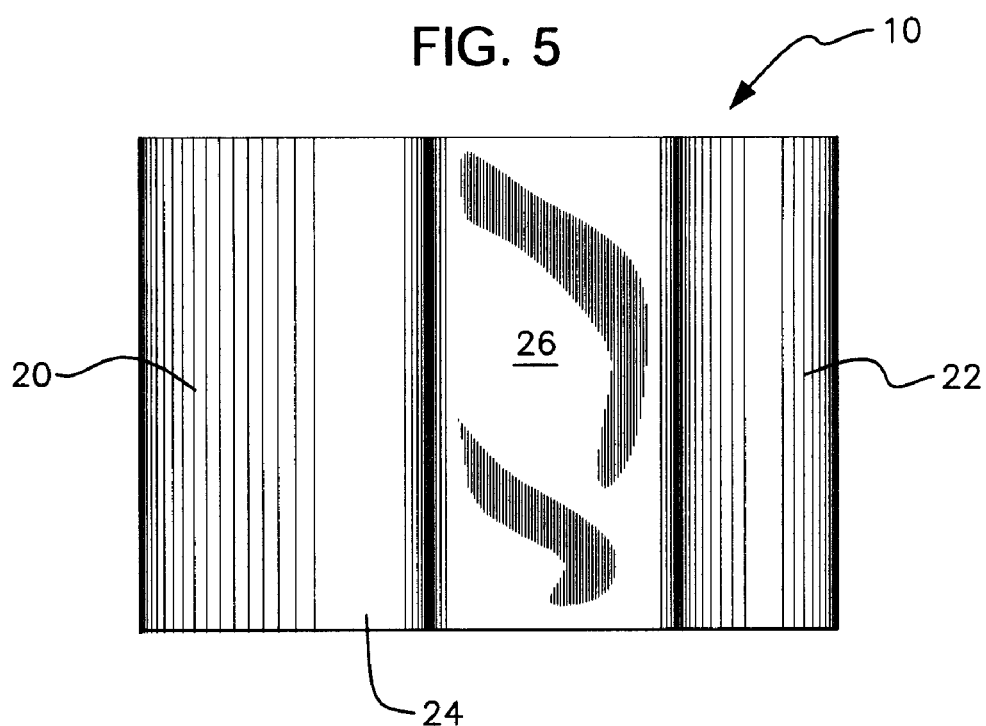
FIG. 5 is a bottom plan view thereof.

The top plan and side elevational views, respectively, of FIGS. 3 and 4 are self-explanatory in view of the foregoing disclosure, as is the bottom view of FIG. 5.

Figure 6:
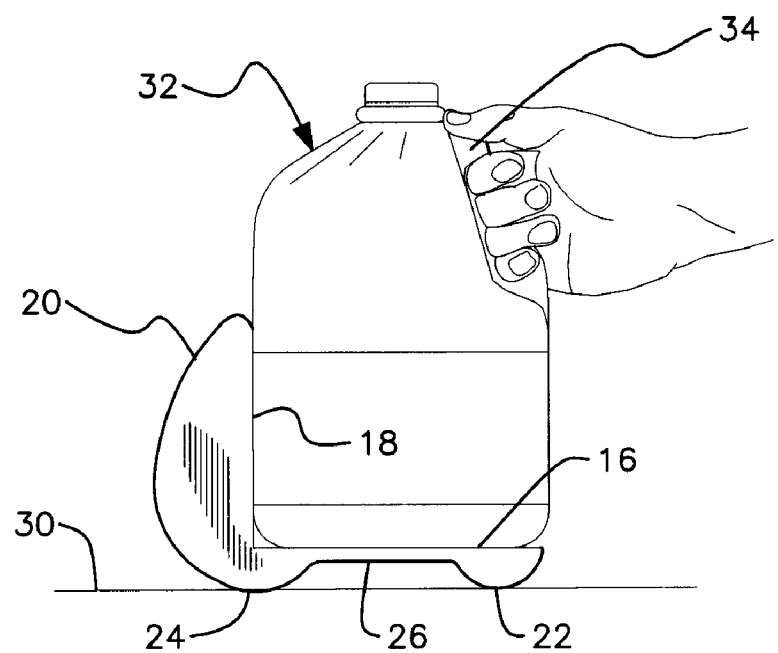
FIG. 6 is the first side elevational view in a series of three side elevational views depicting how the device is used.

FIG. 6 is the first side elevational view on a series of three side elevational views depicting how the novel structure is used. In FIG. 6, device 10 is in its position of repose on a support surface 30 such as a tabletop. A gallon or other size container 32 of milk, juice, or the like is positioned atop flat support surface 16 and a preselected side of said container is disposed in abutting relation to vertical surface 18 of sidewall 14. A user has grasped handle 34 in FIG. 6.

Figure 7:
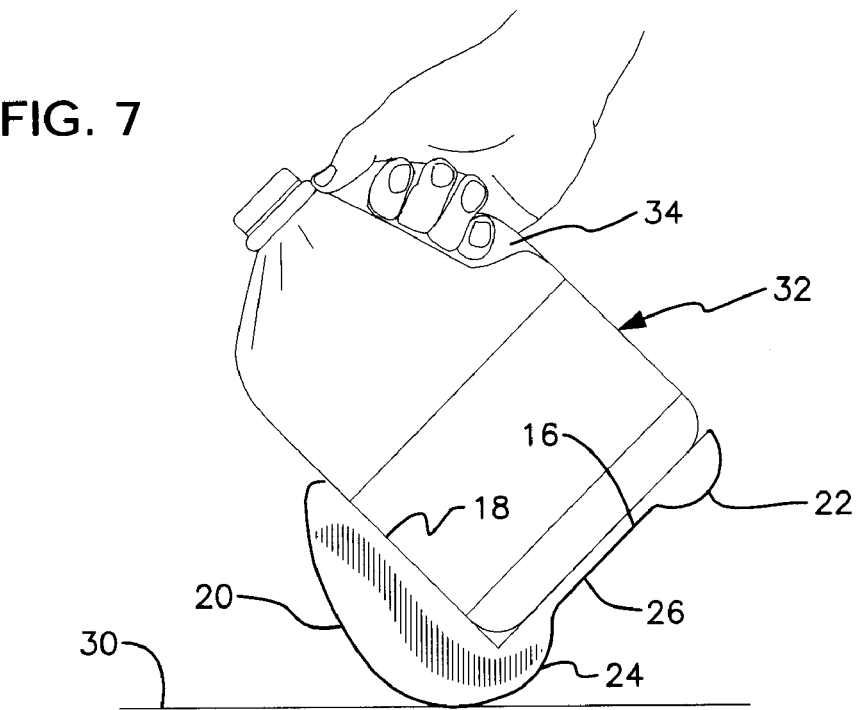
FIG. 7 is the second view in said series.
Figure 8:
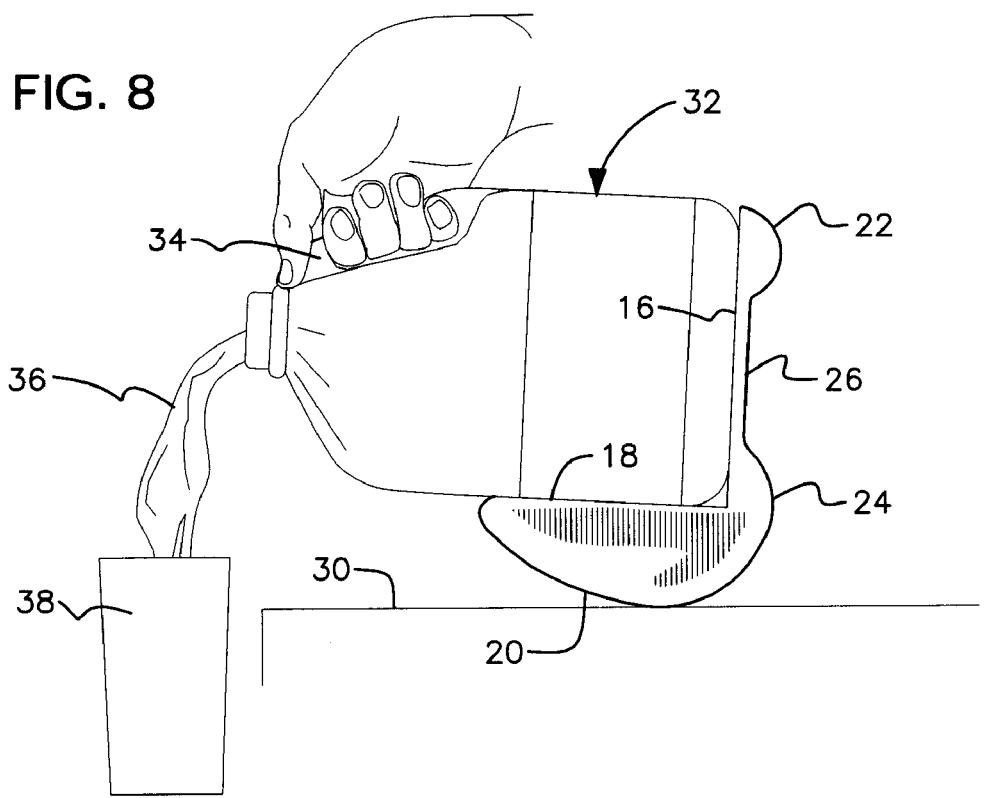
FIG. 8 is the third view in said series.

The user has tilted container 32 in FIG. 7 by rotating said container toward second foot member 24 and hence toward curved surface 20, thereby causing first foot member 22 of base 12 to lift from the tabletop. Further rotation onto curved surface 20 is depicted in FIG. 8. Liquid 36 from container 32 is now poured into small container 37 as indicated.

The user returns base 12 to its position of repose by rotating said base in an opposite direction.

Significantly, the user never needs to lift container 32 from device 10 at any time during the pouring operation. The gentle curvature of curvature 20 ensures that the tilting operation will be smooth and easy to perform.

When a container is empty, the user may use both hands to place a full container atop device 10. However, both hands are not needed to pour from the container. Nor will the container slip and empty its contents as may happen even when a user attempts to tilt a heavy container over with both hands in the absence of device 10.

Device 10 provides an affordable, easy-to-use solution to a problem encountered frequently by those having poor hand strength.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,

What is claimed is:

1. A device that facilitates pouring liquid from a container, comprising:

a generally square base having a back end and a front end;

said base adapted to be supported atop a support surface;

a sidewall formed integrally with said base at said front end;

said sidewall disposed in normal relation to said base;

said base having a flat top surface;

said flat top surface of said base being adapted to support a generally flat bottom wall of a liquid-holding container having a handle;

said liquid-holding container having said bottom wall, a top wall having a spout formed therein, a front wall, a back wall, and a pair of sidewalls, said handle being formed integrally with said back wall and being disposed rearwardly of said spout;

said sidewall of said base having a flat back surface adapted to abut said front wall of said liquid-holding container;

said sidewall of said base having a curvature formed in a front surface thereof, said curvature extending from a lowermost end of said sidewall of said base to an uppermost end thereof;

said curvature being uniform from a front of said device to a back thereof so that said device is stable when rotated onto said curvature, said back end of said base being lifted from said support surface when said container is rotated;

a first foot formed at said back end of said base, said first foot having a curved bottom surface;

a second foot formed at said front end of said base, said second foot having a curved bottom surface; and said curved bottom surface of said second foot being seamlessly formed with said curvature formed in said front surface of said sidewall of said base;

whereby said liquid-holding container is supported by said flat top surface of said base when said device is in a position of repose;

whereby said liquid-holding container is supported at least in part by said flat back surface of said sidewall of said base when said device is rotated onto said curvature;

whereby liquid is poured from said container when said device is rotated onto said curvature by a user grasping the handle of the container so that said liquid is poured from said container in a direction away from said user;

whereby said user need not lift the liquid-holding container from said flat top wall of said base during said pouring procedure; and whereby said user need not lift said device from said support surface during said pouring procedure.

2. The device of claim 1, wherein said first foot and said second foot space said base apart from said tabletop to provide a mechanical advantage to the rotation of said device about said second foot and onto said curvature.

* * * * *